Figure 1:
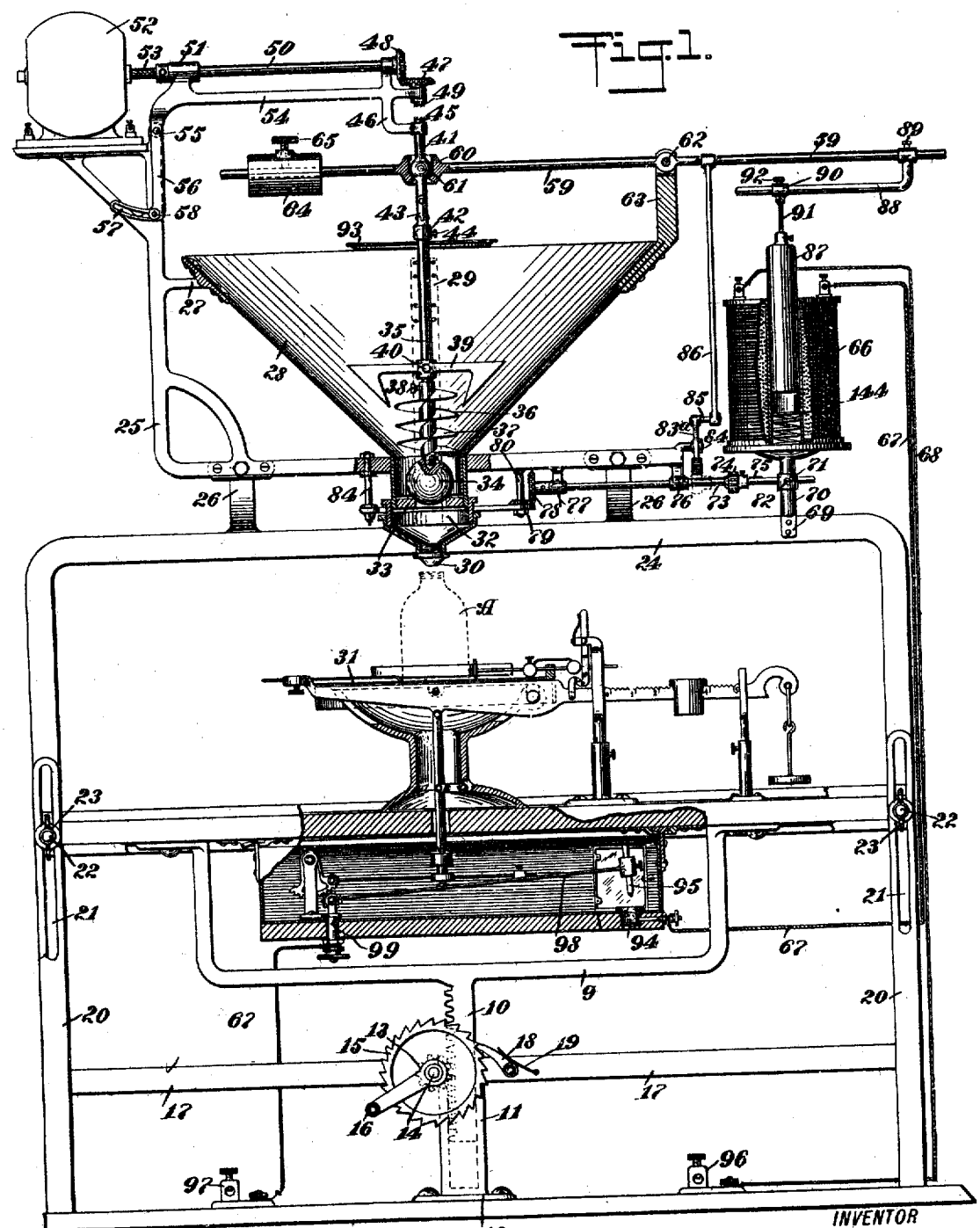

A. P. JOHNSTONE.
SCALE.
APPLICATION FILED MAY 22, 1909.

954,302.

Patented Apr. 5, 1910.
4 SHEETS—SHEET 1.

INVENTOR
Antoine P. Johnstone
BY Munn & Co
ATTORNEYS

WITNESSES
Ben. ...
J. P. Davis

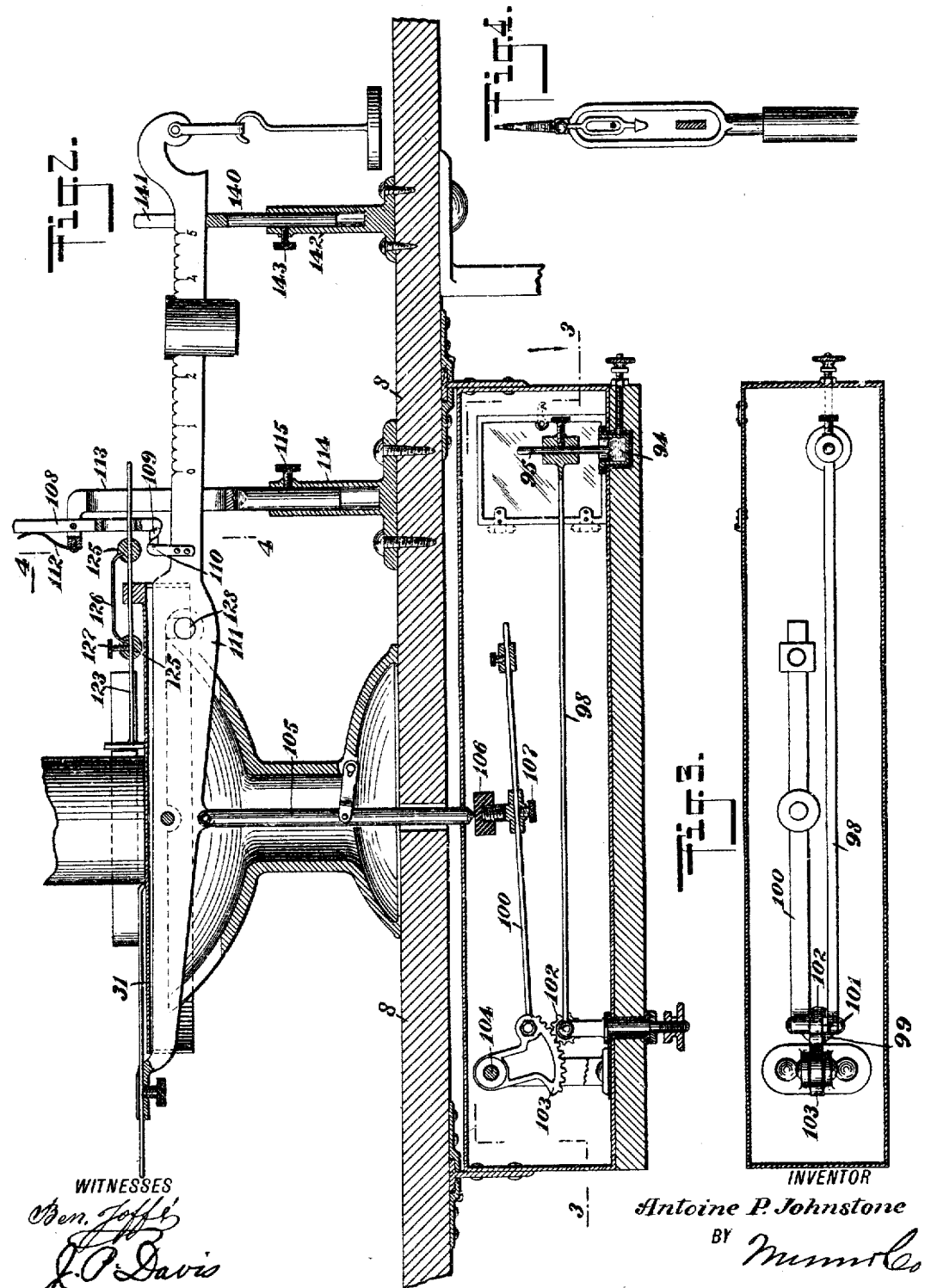

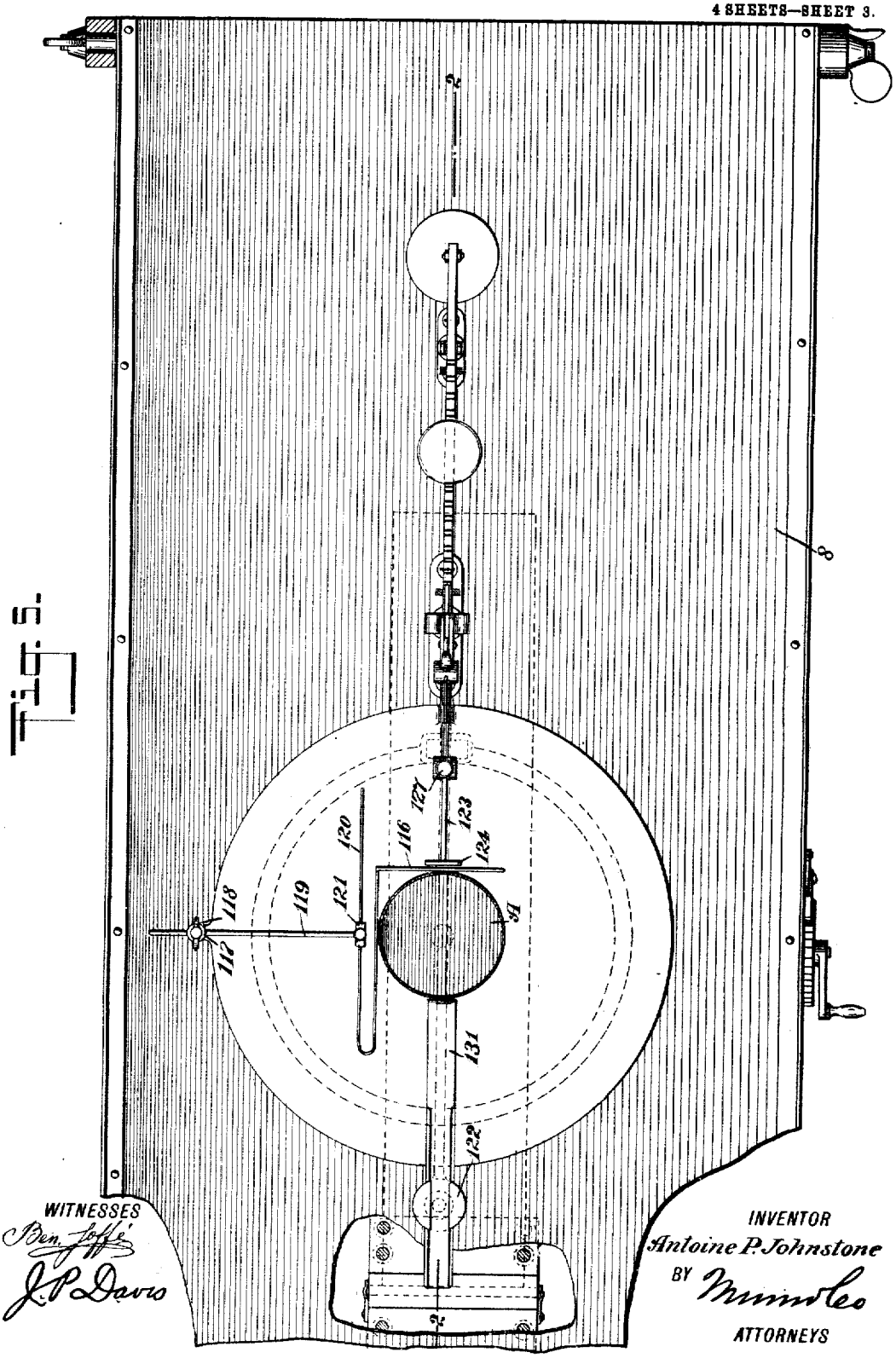

A. P. JOHNSTONE.
SCALE.
APPLICATION FILED MAY 22, 1909.
954,302.
Patented Apr. 5, 1910.
4 SHEETS—SHEET 4.
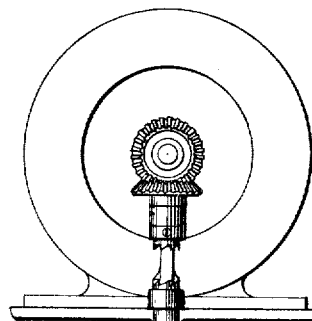
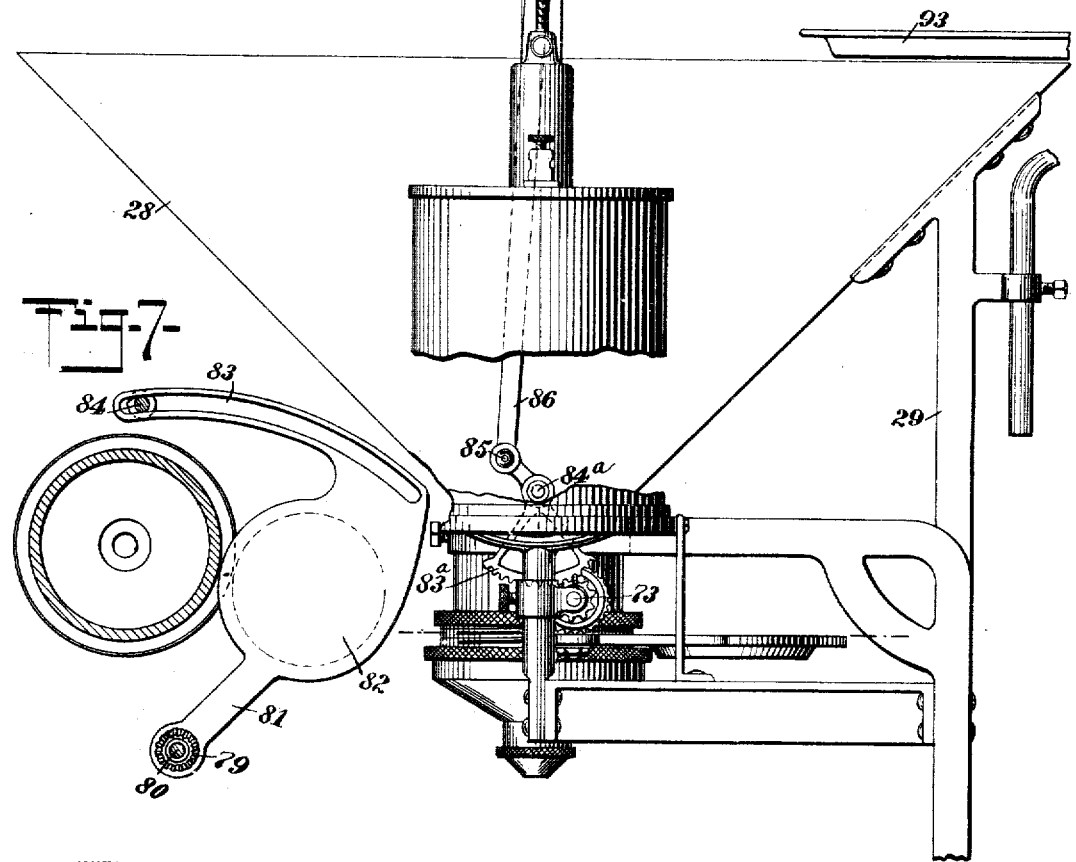
WITNESSES
INVENTOR
Antoine P. Johnstone
BY
ATTORNEYS

UNITED STATES PATENT OFFICE.

ANTOINE P. JOHNSTONE, OF CLEVELAND, OHIO.

SCALE.

954,302.

Specification of Letters Patent.

Patented Apr. 5, 1910.

Application filed May 22, 1909. Serial No. 497,693.

*To all whom it may concern:*

Be it known that I, ANTOINE P. JOHNSTONE, a citizen of the United States, and a resident of Lakewood, Cleveland, in the county of Cuyahoga and State of Ohio, have invented a certain new and useful Improvement in Scales, of which the following is a full, clear, and exact description.

The principal objects which the present invention has in view are: to provide a weighing scale having a pouring attachment to deliver only when a receptacle is in receiving position; to provide a pouring attachment for such a scale adapted to be adjusted above the platform of the scale; to provide a locking attachment for the scale-beam to prevent the flow from the pouring device, except under certain conditions; to provide a pouring attachment adapted to handle plastic and dry materials, and provided with varied spout openings; and to provide an electrically-operated mechanism for terminating the delivery from the pouring device when the desired weight has been obtained.

One embodiment of the present invention is illustrated in the accompanying drawings, wherein like characters of reference indicate like parts in all the views.

Figure 1 is a side elevation, partly in section, of the scale and the pouring attachment constructed in accordance with my invention; Fig. 2 is an enlarged view in vertical section, similar to that shown in Fig. 1, the section being taken on the line 2—2 in Fig. 5; Fig. 3 is a sectional view of the housing for the electric contacts, the section being taken on the line 3—3 in Fig. 2; Fig. 4 is a detail view in elevation, of the locking trigger and mounting therefor, the scale-beam being shown in section on the line 4—4 in Fig. 2; Fig. 5 is a plan view of the table on which the scale is mounted; Fig. 6 is a detail view in side elevation of the hopper and supporting frame thereof, and the ejecting and closing mechanism therefor, and Fig. 7 is a detail view in plan of the pouring spout and the cut-off gate therefor.

The scale proper is suitably mounted upon a table 8, supported on a yoke-frame 9 which is extended from either side of a jack 10, mounted in a standard 11, the base 12 of which is suitably secured to the floor or counter, as desired. The jack 10 is provided with suitable rack teeth with which a pinion 13 is in toothed engagement. The pinion 13 is secured on a shaft 14, upon which is likewise secured a ratchet 15 and a crank 16. The standard 11 is held in position by side braces 17, and upon one of these braces is mounted a pawl 18, which engages the teeth of the ratchet 15, being impelled thereto by a leaf-spring 19.

The table 8 is steadied in its adjusted position by slotted uprights 20, provided with slots 21, through which bolts 22 extend, to be engaged by wing nuts 23. When the wing nuts 23 are turned hard against the side of the standards 20, the table 8 is held rigidly in position. The purpose in adjusting the table 8 vertically in the manner described, is to vary the distance between the table 8 and a cross-beam 24 upon which a frame 25 is supported. To receive the frame 25 brackets 26 are provided.

From the frame 25 is extended a bracket 27, to which is rigidly secured a hopper 28, extended through a ring provided in the lower member of the frame 25, to receive the said hopper, as shown in Figs. 1 and 6 of the drawings. The hopper 28 is further secured in position by an extension 29 of the cross-beam 24. The hopper 28 is thus mounted rigidly in position, and the center of the nozzle 30 of the hopper is extended outward to aline with the center of the platform 31 of the scale mounted upon the table 8. The nozzle 30 may vary in size, this variation being accomplished by the substitution of different nozzles having differing openings. In each case the nozzle is screwed in position upon a collar 32 extended just below a valve seat 33, the opening in the valve seat 33 being normally closed by a ball 34, attached to a shaft 35 by being screwed upon the end thereof. Surrounding the shaft 35 is a tube 36, upon which is projected a suitable wide flanged worm 37. The tube 36 is adjustably mounted on the shaft 35, being secured in position thereon by a set nut 38. Upon the same shaft 35 is an agitator 39, likewise adjustably mounted and secured in position by a set nut 40. The worm 37 and the agitator 39 are secured on the shaft 35.

The shaft 35 is connected to a shaft 41, by being fixedly held in one of the members 42 of a flexible or knuckle connection 43, the attachment being effected between the shaft 35 and the member 42 by means of a set screw 44. The upper end of the shaft 41 is serrated to form crown ratchet teeth 45, and the shaft 41 is slidably and guidably mounted in the outer end of a bracket 46. The bracket 46 has the three extensions, shown in Fig. 1 of the drawings. At the outer end of each of the extensions are formed bearings, one for the shaft 41 as described, another for a short shaft connected with a miter gear 47, and another for a miter gear 48; by means of this construction, the miter gears 47 and 48 are permanently engaged. The lower extremity of the short shaft upon which the miter gear 47 is mounted, is serrated to form crown ratchet teeth 49, shaped to mesh with the teeth 45. By means of this construction and arrangement, whenever the shaft 41 is lifted so that the upper end thereof engages the lower end of the short shaft carrying the gear 47, the teeth 45 and 49 are engaged, so that the rotary motion of the miter gear 47 is imparted to the shafts 41 and 35. The rotary motion mentioned as being imparted to the miter gear 47, is transmitted through a shaft 50 which is suitably mounted in a bearing 51, and is connected to an electric motor 52 through a flexible shaft connection 53.

The bracket 46 and the bearing 51 are integral with an arm 54, pivotally mounted at 55 upon the upright of the frame 25. Below the pivot 55 the arm 54 is provided with an extension 56, at the lower end whereof is formed a quadrant slot 57, arranged as shown in Fig. 1 of the drawings to enfold a set screw 58. The screw 58 is provided with a suitable washer to extend over the sides of the slot 57, in such manner that when the set screw 58 is set up hard against the said washer, the same jams the sides of the slot against the upright of the frame 25 to hold the arm 54 in rigid position. This adjustment of the arm 54 is for the purpose of permitting the alinement of the shafts 41 and 35 to various sizes of the hopper 28, or slight disadjustment in the swing of the said shafts.

The engagement between the teeth 45 and 49 of the shaft 41 and those of the miter-gear 47 is accomplished by means of a lever 59, which is provided with a cup 60, adapted to receive a ball-joint 61 formed on the said shaft 41. This cup and ball connection permits the shaft 41 to rock, to accommodate the movement just above described on the part of the arm 54. It also accommodates the changing alinement of the shaft 41 and the lever 59 in the rise of the former.

The lever 59 is pivotally mounted at 62 in a bracket 63, rigidly secured on the edge of the hopper 28. The lever 59 is normally lowered to the position shown in Fig. 1 of the drawings by means of an adjustable weight 64, slidably mounted upon a further extension of the lever 59 and secured in position thereon by a set screw 65.

The lever 59 is moved on a pivot 62 to raise the shaft 41, to engage with the shaft mounting the miter-gear 47, by means of a solenoid 66, which is energized by the current passing through wires 67 and 68, which are a part of any suitable circuit. The solenoid is mounted upon a bracket 69, which is extended from the frame 25. To the bracket 69 is rigidly secured a rod 70, upon which is slidably mounted a collar 71. The collar 71 is secured in position by a set screw 72 and forms a bearing for a small shaft 73, having slidably mounted thereon a pinion 74, rotatably held on the shaft 73 by a feather 75. The pinion 74 is adapted to be shifted from the position shown in full lines in Fig. 1 to the position shown in dotted lines in the same figure.

The shaft 73 is mounted in bearings 76 and 77, and has mounted on the outer end thereof a miter-gear 78, which is held in toothed engagement with a companion miter-gear 79, mounted upon a shaft 80 depending from the lower arm of the frame 25. The miter-gear 79 is rigidly mounted upon an arm 81 of a disk cut-off 82, provided with an extension forming a quadrant-slot 83, which is slotted from the center of the shaft 80. Through the slot 83 is extended a bolt 84, having a head sufficiently large to engage the sides of the slot 83, to support the cut-off 82. The cut-off 82 is adapted to extend across the opening in the valve-seat 33 and below the same, to effectually close the opening and to catch any drippings therefrom. By rotating the shaft 73 the cut-off 82 is thrown back and forth under the valve-seat 33, as described. The rotary motion of the shaft 73 is imparted thereto by a gear segment 83ᵃ, pivotally mounted at 84 and connected at 85 with a pitman 86, rotatably connected with the shaft 59.

With an apparatus thus constructed, the operation is as follows: Normally the operative parts are held in the position shown in Fig. 1 of the drawings, wherein the valve 34 is seated and the pinion 74 is held out of contact with the segment 83ᵃ. When, as will hereinafter be described, the solenoid 66 is energized, the core 87 is drawn to its seat within the solenoid, carrying the lever 59 down on the outer side of the fulcrum 62, raising the inner end of the lever with the weight 64 and with it the end 45 for engagement with the toothed end 49, lifting the valve 34 from its seat and opening the passageway to the delivery nozzle 30. The motor 52 is continuously operated, driving the shaft 50 and the miter-gears 47 and 48. Hence, when the engagement between the ends 45 and 49 transpires, the rotation of the shaft 50 is transmitted to the shaft 35, rotating the agitator 39 and the worm 37. The worm 37 operates to force downward the contents of the hopper 28, to compel the same to be emitted constantly from the nozzle of the hopper. When the solenoid 66 is deënergized, the reversal of the above-described actions transpires. This reversal returns the parts to the position shown in Fig. 1 of the drawings, wherein the valve 34 is suitably seated on the seat 33. When now the pinion 74 is thrown into the position shown in dotted lines, the action of the falling core 87 through the pitman 86 produces an action on the part of the segment 83, the pinion and the miter-gears 78 and 79, to throw the disk cut-off 82 across the path of the valve-seat. It will be observed that this has the effect of closing the valve-seat opening when the valve 34 is raised to a delivery position. This is intended to provide for the removal of the shaft 35 and parts connected therewith, which is usually performed when it is desired that the hopper 38 be cleaned. When this cleaning is accomplished, the shaft 35 may be removed by releasing the set-screw 44 and raising the shaft 41 to free the top of the shaft 35, when the same may be lifted out of the hopper 28, leaving the same accessible for cleaning purposes.

The present invention is primarily intended as a measuring device for heavy oils, paints or oil mastics, and, when desired, a solvent such as benzin is employed for cleaning. The facility with which this delivering mechanism can be cleaned is a great advantage in the present invention, as the time saved in this operation forms the difference between a successful machine and one that is not a success. When the parts have been cleaned, the soiled solvent is delivered into a suitable receptacle by the removal of the disk 82 from the passage. The cleaned shaft 35 with the agitator and worm, are then inserted in the operative position and coupled to the shaft 41, and the apparatus is now in its initial condition. The pinion 74 is now moved back to the position shown in full lines in Fig. 1, wherein it is not engaged by the segment 83, and the shaft 73 remains immovable.

The core 87 is attached to the lever 59 by an adjusting arm 88, slidably mounted upon the outer end of the lever 59 and secured fixedly in position thereon by a set-screw 89. The core 87 is connected to the arm 88 by a collar 90, to which it is connected by an insulated flexible connection 91. The collar 90 is fixedly attached in its adjusted position upon the arm 88 by a set-nut 92.

In many instances, such, for instance, as in the handling of mastics, it is desired that the contents of the hopper 28 shall be liquefied. It is for this purpose that I have provided a platform 93, which is adapted to extend over the hopper, as shown in Fig. 6 of the drawings. If the liquefied element be oil, this is stirred into the mastic by the agitator 39 when rotated by the electric motor 52.

It will be seen that the operation of the delivering apparatus thus described, is controlled by the solenoid 66, which in turn is controlled by the current supplied thereto from the wires 67 and 68. The wires 67 and 68 are connected by suitable binding posts to a mercury cup 94 and the service main contacts 96. The wire 67 has interposed between the solenoid and the service main contact 97 a circuit-breaker which, in the present instance, is a carbon pencil 95. The pencil 95 is adjustably mounted on an extended rod 98, rotatably mounted in a post 99. The rod 98 is fixedly connected with a small gear 102, by means of a bolt 101 which also serves as a pivot for the said rod. The small pinion 102 is in toothed engagement with a gear-segment 103, which is fixedly mounted upon the end of an arm 100 and is pivotally mounted at 104. With the raising and lowering of the arm 100, a comparatively small movement in the larger segment produces an increased movement in the rod 98, because of the diminished diameter of the pinion 102. By means of this action a comparatively small movement up and down on the part of the arm 100 produces a quick and lengthened action on the part of the pencil 95, thereby avoiding any arcing between the pencil and the mercury cup 94. The scale is so arranged that from the carrying end of the scale beam, there depends a rod 105, which rests upon an insulated button 106, fixedly mounted upon the arm 100 by means of a set nut 107. By this arrangement, as the scale is released so that the load-supporting arm is raised, prior to receiving the material to be weighed, the arm 100 is raised, rotating the segment 103 to cause an opposite rotation of the pinion 102, which depresses the arm 98 and the pencil 95, to immerse the latter in the mercury of the mercury cup 94. Should the action of the parts be extended beyond that calculated, the rod 98 which is constructed of flexible material, yields and bends without injury to any of the parts. With the immersion of the pencil 95 in the cup 94, the electric circuit in the wires 67 and 68 is completed, energizing the solenoid 66 to draw the core 87 and thereby set in operation the various instrumentalities to deliver the material from the hopper 28 as above described. When, in the course of its operation, there is delivered sufficient of the material being measured to depress the load-supporting side of the scale to a level, the arm 100 is depressed, to raise the pencil 95 out of contact with the mercury in the mercury cup 94. This parting of the pencil and mercury cup breaks the circuit flowing through the solenoid 66 and deenergizes the same, permitting the weight 64 to depress the valve 34 to its seat 33 and separate the shafts 41 and 50, thus discontinuing the supply of the material being measured. It is in this position that the scale is locked, and where it normally stands. The locking device for maintaining the scale beam in the balanced or full weight position, comprises a latch arm 108 at the lower end of which is formed a latch head 109, adapted to engage a hook 110, fixedly mounted upon the graduated side of the scale beam 111. The latch arm 108 is actuated by a leaf spring 112 suitably mounted upon a carrying arm 113 provided for adjusting the latch arm 108. The carrying arm 113 is suitably formed to pass the scale beam 111, and is adjustably mounted in a standard 114 which is fixedly mounted upon the table 8. The carrying arm 113 is fixed in position as adjusted, in the standard 114, by a set screw 115. By means of this construction, the locking position of the latch head 109 can be nicely adjusted to any play or disparity which may arise in the balance of the scale beam 111.

There is provided on the platform 31 of the scale, an adjusting member 116 which is a flat sheet metal construction formed to an angle provided to receive a can or other article A, when placed upon the scale platform. It is adjustably mounted upon the scale platform by means of a post 117 and a wing nut 118 mounted therein. Extending through the post 117 and engaged by a wing nut 118 is a rod 119, upon which the adjusting member 116 is adjustably mounted. For this mounting the member 116 is provided with an elongated extension 120, which passes through a slot in a collar 121 fixedly mounted upon the end of the rod 119. The member 116 is disposed so that when the article to contain the material being measured is placed upon the platform of the scale, the same fits within the angle of the said adjusting member 116. Extended from the one side of the scale platform is a set rod 131, which is extended through suitable slide grooves, and therein secured by a thumb nut 122. This nut is adjusted in position so that whatever is placed in the angle of the member 116 as shown, must force the said member slightly to one side and in doing so move a rod 123, the head 124 of which rests against the side of the member 116. The rod 123 has fixedly secured thereon small cylindrical buffers 125, suitably connected by a spring 126 and one of which is secured fixedly to the rod 123 by a nut 127. The rod 123 is adjusted to suit the conditions under which the scale is operating. In this position the outer buffer 125 extends across the opening in the trigger arm 108.

When now a scale is constructed and arranged as set forth, the normal position is that shown in Fig. 1 of the drawings, wherein the latch head 109 is under the hook 110 and the weight carrying beam is held in position thereby. With the introduction on to the scale platform of the carton A, the member 116 is moved against the head 124 of the arm 123, in order that the carton can pass beyond the end of the adjusting member 131. In doing this, the buffer 125 is thrown against the latch arm 108, moving the same out of engagement with the hook 110, and allowing the graduated extension of the scale beam with the hook 110 to fall below the latch head 109. In the fall of the graduated extension of the scale beam, which is pivoted at 128, the arm 105 is raised, causing the pencil 95 to descend to complete the circuit which energizes the solenoid 66, resulting in the operating of the members within the hopper which deliver the material therein to the carton A. This action continues until the carton has received the full weight when the scale beam leveling under the weight of the carton depresses the rod 105 to lift the pencil 95, causing the suspension of the delivering instrumentalities in the hopper 28. In this position the latch head 109 again engages the hook 110 and the scale is in its initial position.

It is to limit and guide the fall and rise of the graduated extension of the scale beam that I have provided an adjustable rod 140, provided with bifurcated arms 141, between which the scale beam operates. The rod 140 is mounted in a standard 142, which is fixedly secured to the table 8, the rod being secured in its adjusted position within the said standard by a set nut 143. By means of this attachment, the scale is prevented from rising too high to strike the carton A against the nozzle 30 and to immerse too deeply within the mercury cup 94, the pencil 95.

Within the core recess of the solenoid 66, I place a spiral spring 144, the object of which is to buffer the drop of the weighted core 87.

It will be noted that the scale platform is of such construction as to prevent the possibility of the internal mechanism of the scale proper becoming mussed up or clogged in the event of an accidental spill of the material being filled or weighed.

Having thus described my invention, I claim as new and desire to secure by Letters Patent:

1. A scale, comprising a holder for the material being handled, adapted to deliver said material upon a weighing scale, a delivery spout for said holder having a valve seat, a rotatable shaft mounted within said holder and provided with a member for closing the said valve and provided with a worm adapted to advance the material through the said spout, a stirring device actuated by said shaft to agitate the said material, and means actuated by said scale for initiating and suspending the rotation of said shaft and the seating of said valve.

2. A scale, comprising a holder for the material being handled, mounted to deliver the material upon a weighing scale, a delivery spout for said holder having a valve seat, an electric motor, a transmission mechanism connected with said motor and extended to said holder, a rotatable shaft mounted within said holder and adapted to be raised to engage with said transmission mechanism, a propelling device mounted on said shaft to advance the said material through the said spout, a valve adapted to rest upon said valve seat to move with said shaft, and electro-mechanical means to raise and lower the said shaft to and from engagement with the said transmission mechanism, said means being actuated by a weighing scale.

3. A scale comprising a holder having a delivery spout; a stationary frame to support said holder; a weighing scale mounted below said spout; a table to support said weighing scale; means for adjusting the said table vertically; means for closing the said spout; and electro-mechanical means to open the said spout.

4. A scale comprising a holder having a delivery spout; a stationary frame to support said holder; a weighing scale mounted below said spout; a table to support said weighing scale; means for closing said spout; electro-mechanical means for opening said spout to deliver the material being handled upon said scale; and a lock to maintain the balanced position of said scale.

5. A scale, comprising a holder having a delivery spout to deliver the material being handled, a stationary frame to support said holder, a weighing scale mounted below the said spout, a table to support said scale means for closing said spout, electro-mechanical means for opening the said spout to deliver the material to balance said scale, said means being actuated by the said scale when raised from balance, and a lock to maintain the balanced position of said scale, said lock being adapted to be released by the carton for receiving said material.

6. A scale, comprising a holder having a delivery spout to deliver the material being handled, a stationary frame to support said holder, a weighing scale mounted below the said spout, a table to support said weighing scale means for closing said spout, electro-mechanical means for opening the said spout to deliver the material to balance said scale, said means embodying a switch for opening and closing the electric circuit, means for connecting the said scale with said switch to close the same when the said scale is out of balance and to open the same when said scale is in balance, and a lock to maintain the balanced position of said scale.

7. A scale, comprising a holder having a delivery spout to deliver the material being handled, a stationary frame to support said holder, a weighing scale mounted below the said spout, a table to support the said weighing scale, a driving mechanism, a transmission mechanism connected with said driving mechanism and extended above said holder, a rotatable shaft mounted within said holder and adapted to be raised to engage with said transmission mechanism, a worm mounted on said shaft to advance the material being handled through the said spout, a valve to move with said shaft, a seat for said valve in said spout to move with said shaft, a lever pivotally mounted to raise said shaft to engage with said transmission mechanism, an electric solenoid adapted to raise said lever to engage the said shaft and transmission mechanism, an electric circuit embodying a switch adapted to be opened and closed by the said weighing scale and comprising the said solenoid, and a lock to maintain the balanced position of said scale.

In testimony whereof I have signed my name to this specification in the presence of two subscribing witnesses.

ANTOINE P. JOHNSTONE.

Witnesses:
L. Q. RAWSON,
MATILDA FISCHER.